US012538216B2

(12) United States Patent
Zhang

(10) Patent No.: US 12,538,216 B2
(45) Date of Patent: Jan. 27, 2026

(54) NETWORK SLICING IN RADIO ACCESS NETWORK

(71) Applicant: NOKIA SOLUTIONS AND NETWORKS OY, Espoo (FI)

(72) Inventor: Qiuyun Zhang, Hangzhou (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 861 days.

(21) Appl. No.: 17/639,367

(22) PCT Filed: Sep. 30, 2019

(86) PCT No.: PCT/CN2019/109566
§ 371 (c)(1),
(2) Date: Mar. 1, 2022

(87) PCT Pub. No.: WO2021/062683
PCT Pub. Date: Apr. 8, 2021

(65) Prior Publication Data
US 2022/0338112 A1    Oct. 20, 2022

(51) Int. Cl.
*H04W 48/18* (2009.01)
(52) U.S. Cl.
CPC ................ *H04W 48/18* (2013.01)
(58) Field of Classification Search
CPC .... H04W 48/18; H04W 60/00; H04W 60/002
See application file for complete search history.

(56) References Cited

U.S. PATENT DOCUMENTS

| 2017/0141973 | A1 | 5/2017 | Vrzic | |
|---|---|---|---|---|
| 2017/0303259 | A1 | 10/2017 | Lee et al. | |
| 2018/0191563 | A1* | 7/2018 | Farmanbar | H04L 41/0843 |
| 2018/0270744 | A1* | 9/2018 | Griot | H04W 48/18 |
| 2018/0324577 | A1 | 11/2018 | Faccin et al. | |
| 2019/0029065 | A1* | 1/2019 | Park | H04W 60/00 |

(Continued)

FOREIGN PATENT DOCUMENTS

| CN | 106572516 A | 4/2017 |
|---|---|---|
| CN | 107580360 A | 1/2018 |

(Continued)

OTHER PUBLICATIONS

Office Action for Chinese Application No. 201980100852.9 dated Nov. 3, 2022, 17 pages.

(Continued)

*Primary Examiner* — Marcus Hammonds
(74) *Attorney, Agent, or Firm* — ALSTON & BIRD LLP

(57) ABSTRACT

Embodiments of the present disclosure relate to methods, devices, apparatuses and computer readable storage media for providing network slicing. The method comprises obtaining information concerning a service to be provided to a second device; determining whether the service is available from a target network slice managed by the first device; and in response to a determination that the service is available from the target network slice, providing at least part of the service to the second device with the target network slice, the target network slice comprising at least one of a common network slice and a dedicated network slice for the second device, the common network slice being preconfigured to provide at least part of the service. By separately deploying dedicated network slices and at least one common network slice, it is possible to ensure the service isolation as well as independent operation and maintenance requirements of various subscribers, enterprises, or etc., in the communication network, at the same time, the communication network is an open network so that the operators can provide services to as many users as possible.

14 Claims, 4 Drawing Sheets

(56) References Cited

U.S. PATENT DOCUMENTS

| | | | |
|---|---|---|---|
| 2019/0174321 A1 | 6/2019 | Sun et al. | |
| 2019/0230584 A1 | 7/2019 | Lou et al. | |
| 2019/0253962 A1 | 8/2019 | Kiessling et al. | |
| 2019/0357129 A1* | 11/2019 | Park | H04W 60/04 |
| 2019/0364541 A1* | 11/2019 | Ryu | H04W 80/10 |
| 2020/0413290 A1* | 12/2020 | Yang | H04L 47/83 |
| 2021/0037455 A1* | 2/2021 | Zhu | H04W 76/27 |
| 2021/0112513 A1* | 4/2021 | Chun | H04W 60/00 |

FOREIGN PATENT DOCUMENTS

| | | |
|---|---|---|
| CN | 108243483 A | 7/2018 |
| CN | 108293004 A | 7/2018 |
| CN | 108366365 A | 8/2018 |
| CN | 108777883 A | 11/2018 |
| CN | 108810993 A | 11/2018 |
| CN | 109565747 A | 4/2019 |
| EP | 3509355 A1 | 7/2019 |
| WO | WO 2017/157118 A1 | 9/2017 |

OTHER PUBLICATIONS

"3rd Generation Partnership Project; Technical Specification Group Services and System Aspects; Study on Architecture for Next Generation System (Release 14)", 3GPP TR 23.799 v0.4.0, (Apr. 2016), 96 pages.

China Mobile, "Clarification of Network Slice ID in Solution 1.6", SA WG2 Meeting #117, S2-165660, (Oct. 17-21, 2016), 7 pages.

Huawei et al., "Key Issues for Support of Network Slicing in RAN", 3GPP TSG RSN WG2 Meeting #96, R2-167585, (Nov. 14-18, 2016), 5 pages.

International Search Report and Written Opinion for Patent Cooperation Treaty Application No. PCT/CN2019/109566 dated Jun. 30, 2020, 7 pages.

Extended European Search Report for European Application No. 19947541.9 dated May 15, 2023, 13 pages.

Office Action for Chinese Application No. 201980100852.9 dated Apr. 27, 2023, 6 pages.

Office Action for European Application No. 19947541.9 dated Oct. 22, 2025, 8 pages.

* cited by examiner

NETWORK SLICING IN RADIO ACCESS NETWORK

CROSS-REFERENCE TO RELATED APPLICATIONS

This application is a national phase entry of International Application No. PCT/CN2019/109566, filed Sep. 30, 2019, the entire contents of which are incorporated herein by reference.

FIELD

Embodiments of the present disclosure generally relate to the field of telecommunication and in particular, to methods, devices, apparatuses and computer readable storage media for network slicing.

BACKGROUND

Network slicing is a mandatory technology, especially in 5G, which allows multiple logical networks to be created on the top of a common shared physical infrastructure. Network slices can be set up based on various service characteristics corresponding to respective service types. The three main service types with specific characteristics are enhanced Mobile broadband (eMBB), ultra-reliable low latency communications (URLLC) and Massive IoT (MIoT). For different service types, service characteristics such as the required throughput, data speed, latency, reliability, capacity and/or coverage are varied.

Network slices are deployed by one or more operators in a public land mobile network (PLMN). A network slice is identified by single Network Slice Selection Assistance Information (S-NSSAI). The S-NSSAI is comprised of a slice/service type (SST) and a slice differentiator (SD). The operator can deploy multiple network slices delivering distinct or exactly the same features or service characteristics for different groups of terminal devices, (e.g., user equipment (UE)), as they deliver a different committed service and/or because they are dedicated to a customer, in which case such network slices may have different S-NSSAI with the same slice/service type but different slice differentiators.

SUMMARY

In general, example embodiments of the present disclosure provide a solution for implementing network slicing in radio access network (RAN).

In a first aspect, there is provided a first device. The first device comprises at least one processor; and at least one memory including computer program codes; the at least one memory and the computer program codes are configured to, with the at least one processor, cause the first device to, obtain information concerning a service to be provided to a second device; determine whether the service is available from a target network slice managed by the first device; and in response to a determination that the service is available from the target network slice, provide at least part of the service to the second device with the target network slice, the target network slice comprising at least one of a common network slice and a dedicated network slice for the second device, the common network slice being preconfigured to provide at least part of the service.

In a second aspect, there is provided a second device. The second device comprises at least one processor; and at least one memory including computer program codes; the at least one memory and the computer program codes are configured to, with the at least one processor, cause the second device to, transmit a request for a service to the first device; and receive a response indicating that at least part of the service is to be provided by a target network slice managed by the first device, the target network slice comprising at least one of a common network slice and a dedicated network slice for the second device, the common network slice being preconfigured to provide the at least part of the service.

In a third aspect, there is provided a method implemented at a first device. The method comprises: obtaining information concerning a service to be provided to a second device; determining whether the service is available from a target network slice managed by the first device; and in response to a determination that the service is available from the target network slice, providing at least part of the service to the second device with the target network slice, the target network slice comprising at least one of a common network slice and a dedicated network slice for the second device, the common network slice being preconfigured to provide at least part of the service.

In a fourth aspect, there is provided a method implemented at a second device. The method comprises: transmitting a request for a service to the first device; and receiving a response indicating that at least part of the service is to be provided by a target network slice managed by the first device, the target network slice comprising at least one of a common network slice and a dedicated network slice for the second device, the common network slice being preconfigured to provide the at least part of the service.

In a fifth aspect, there is provided an apparatus comprises means for obtaining information concerning a service to be provided to a second device; means for determining whether the service is available from a target network slice managed by the first device; and means for providing, in response to a determination that the service is available from the target network slice, at least part of the service to the second device with the target network slice, the target network slice comprising at least one of a common network slice and a dedicated network slice for the second device, the common network slice being preconfigured to provide at least part of the service.

In a sixth aspect, there is provided an apparatus comprising means for transmitting a request for a service to the first device; and receiving a response indicating that at least part of the service is to be provided by a target network slice managed by the first device, the target network slice comprising at least one of a common network slice and a dedicated network slice for the second device, the common network slice being preconfigured to provide the at least part of the service.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
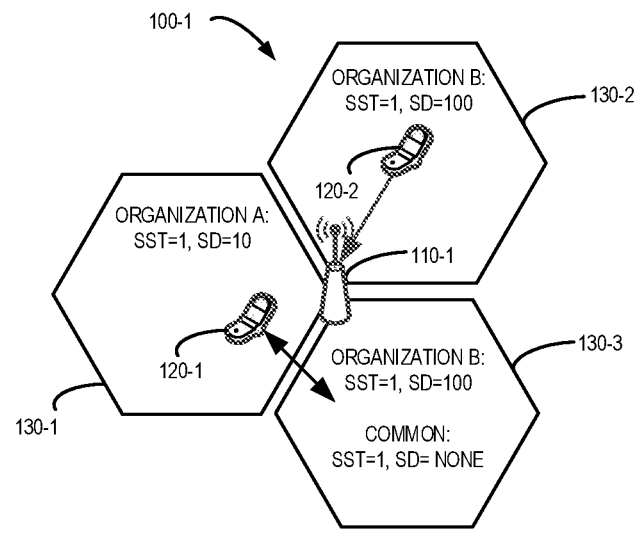
FIG. 1A shows an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a 5G or next generation NodeB (gNB), a Remote Radio Module (RRU), a radio header (RH), a remote radio head (RRH), a low power node such as a femto, a pico, and the like. For the purpose of discussion, in some example embodiments, the gNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Position Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some example embodiments, the terminal device may be configured to transmit and/or receive information without direct human interaction. For example, the terminal device may transmit information to the network device on predetermined schedules, when triggered by an internal or external event, or in response to requests from the network side. Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:

(a) hardware-only circuit implementations (such as implementations in only analog and/or digital circuitry) and (b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Network slices are deployed in the radio access network (RAN) by operators. As noted above, a network slice is uniquely identified by an S-NSSAI. Upon establishing a network slice, a corresponding S-NSSAI is binded with the network slice. As noted above, the S-NSSAI may include a Slice/Service Type (SST), and optionally a slice differentiator (SD). The SST is used for indicating an expected network behavior in terms of a service requested for the user equipment. The SD, which is optional information, may complement the SST to differentiate a single network slice from among a plurality of network slice instances deployed in the communication network that comply with a requested SST. In particular, the S-NSSAI may be set as a standard value, i.e., only including an SST with a standardized SST value, or a non-standard value, i.e. including both an SST and an SD or only including an SST with a non-standardized SST value. An S-NSSAI with a non-standard value identifies a single Network Slice within the PLMN with which it is associated, and such an S-NSSAI should not be used by the UE in access stratum procedures in any PLMN other than the one to which the S-NSSAI is associated. Standardized SST values are shown in table 1 below.

TABLE 1

Standardized SST values

| Slice/Service Type (SST) | SST value | Characteristics |
| --- | --- | --- |
| eMBB | 1 | a network slice suitable for handling of enhanced Mobile Broadband traffic |
| URLLC | 2 | a network slice suitable for handling of ultra-reliable low latency communications traffic |
| MIoT | 3 | a network slice suitable for handling Massive IoT traffic |

Assume that an organization A subscribes and registers in a communication network, such as a given public land mobile network (PLMN). The operator may then allocate a network slice for supporting customized services requested by the organization A. In this case, the network slice allocated to the organization A may be accessible to a group of users from organization A, and thereby the group of users is provided with respective services supported by the network slice. Since the network slices are configured in a radio access network in tracking area level, a same slice configuration, which may be in a form of S-NSSAI, is shared within a single tracking area. In the case that a terminal device from the organization A registered with a specific S-NASSI moves from an source cell to a target cell and the same S-NSSAI is not configured in the target cell, the handover request from the terminal device may be rejected by the target cell, which will cause a failure of handover. Although the operator may preconfigure respective network slices with the same S-NASSIs for specific subscribers in more than one cell, it is inefficient and a waste of network resources.

According to embodiments of the present disclosure, a solution for optimizing network slicing across tracking areas is provided. With the solution, the registration or handover procedure of a device, such as a terminal device, can be successfully completed even if no dedicated network slice is preconfigured for the terminal device in the target cell.

More details of embodiments of the present disclosure are now provided below with reference to FIGS. 1A to 6.

FIG. 1A shows an example communication network 100-1 in which embodiments of the present disclosure can be implemented. The communication network 100-1 includes a first device 110-1 and second devices 120-1 and 120-2, and the first device 110-1 provides respective coverage of cells 130-1, 130-2 and 130-3.

Assume that the second device 120-1 is from the organization A, and the second device 120-2 is from organization B. The organization A has registered in cell 130-1, and a dedicated network slice corresponding to the organization A is identified by the S-NSSAI of "SST=1, SD=10". For example, as shown in the above table 1, the value of "SST=1" represents the network slice supports services for handling the eMBB traffic.

In cell 130-2, there is also a network slice identified by the same S-NSSAI of "SST=1, SD=10". In this case, when the second device 120-1 moves from cell 130-1 to cell 130-2, the first device 110-1 may receive a handover request from the second device 120-1 and then provide the second device 120-1 with services supported by the network slice identified as the S-NSSAI of "SST=1, SD=10" dedicated to the organization A.

The organization B has registered in cell 130-3, and a dedicated network slice identified by the S-NSSAI of "SST=1, SD=100" and corresponding to the organization B is deployed in cell 130-3. In this case, when the second device 120-2 is intended to access cell 130-3, the first device 110-1 may receive an initial context setup request from the second device 120-2, and provide services supported by the network slice identified as the S-NSSAI of "SST=1, SD=100" dedicated to the organization B to the second device 120-2.

In a single cell, there may be more than one network slice which corresponds to separate subscribers. For example, in addition to the network slice of organization A, another network slice identified by the S-NSSAI of "SST=1, SD=100" is also deployed in cell 130-1. In cell 130-3, there is also a common network slice identified by an S-NSSAI of "SST=1, SD=none". According to the example embodiments, the common network slice is configured to provide at least part of services having a specific SST value, and is accessible by all the terminal devices which request for the service having a same SST value. In this embodiment, the terminal devices may or may not be from a same organization.

Figure 1B:
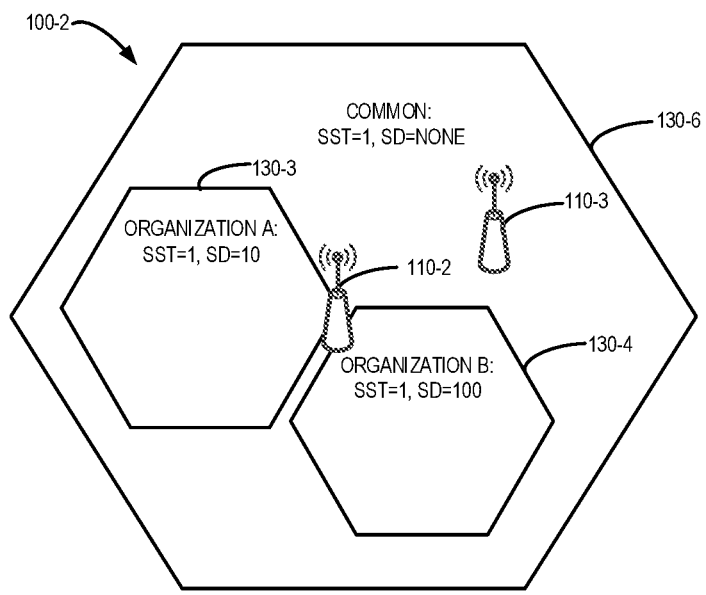
FIG. 1B shows another example communication network in which example embodiments of the present disclosure may be implemented.

It is to be understood that although cells 130-1, 130-2 and 130-3 are controlled by the same first device 110-1, in practice, they may be respectively controlled by more than one network device. As shown in FIG. 1B, the example communication network 100-2 includes micro cells 130-4 and 130-5 controlled by a first device 110-2, and a macro cell 130-6 overlapping with the cells 130-4 and 130-5 and controlled by a first device 110-3. For example, the first devices 110-2 and 110-3 may be two network devices of different types. In this embodiment, dedicated network slices identified by S-NSSAIs of "SST=1, SD=10", "SST=1, SD=100" and the common network slice identified by S-NSSAI of "SST=1, SD=none" are deployed in the cells 130-4, 130-5 and 130-6, respectively.

Furthermore, it is to be understood that the number of network devices, terminal devices and/or cells is given for the purpose of illustration without suggesting any limitations to the present disclosure. The communication network 100-1 may include any suitable number of network devices, terminal devices and/or cells adapted for implementing implementations of the present disclosure.

Figure 2:
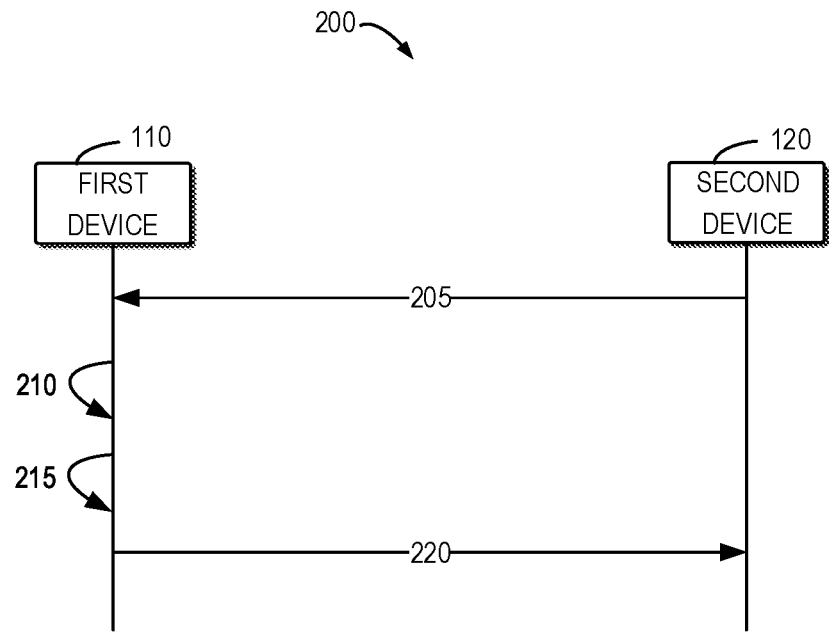
FIG. 2 shows a schematic diagram illustrating a process for implementing network slicing according to example embodiments of the present disclosure.

Principle and embodiments of the present disclosure will be described in detail below with reference to the accompanying drawings. FIG. 2 shows a schematic diagram illustrating a process 200 for implementing network slicing according to an example embodiment of the present disclosure. For the purpose of discussion, the process 200 will be described with reference to FIG. 1A. The process 200 may involve the first devices 110-1 and 110-2 (collectively referred as to the first device 110) and the second devices 120-1 and 120-2 (collectively referred as to the second device 120) as illustrated in FIGS. 1A and 1B. It would be appreciated that although the process 200 has been described in the communication system 100-1 of FIG. 1A, this process may be likewise applied to other communication scenarios.

Assuming that the second device 120-1 serving by the network slice identified by the S-NSSAI of "SST=1, SD=10" deployed in cell 130-1 is moving away from the source cell 130-1 and towards the target cell 130-3, a handover request of the second device 120-1 may be transmitted to the target cell 130-3 from a Xn or NG interface.

The handover request or the path switch request may include a session setup request for a specific service. In some example embodiments, a session setup request may be a protocol data unit (PDU) session resource setup request. In a case that the source cell and the target cell are separately controlled by two different network devices, for example, as shown in FIG. 1B, where the source cell 130-4 is controlled by the first device 110-2 while the target cell 130-6 is controlled by the first device 110-3, the handover request or a path switch request for switching to the target cell 110-3 may be transmitted from the first device 110-2 to first device 110-3.

In the process 200 as shown in FIG. 2, the second device 120 may transmit 205 a request for the service to the first device 110. For example, the request for the service may include information concerning the services supported by a dedicated network slice identified by the S-NSSAI of "SST=1, SD=10".

The first device 110, upon receipt of the request, obtains 210 the information concerning the service, for example, the S-NSSAI of "SST=1, SD=10". The first device 110 may obtain the SST value of the service (e.g., SST=1) from the information concerning the service, and check 215 NSSAI of candidate network slices deployed in the target cell 130-3. If a slice service type of at least one of the candidate network slices matches SST value of "1", the first device 110 determines that the service is available from the target cell 130-1. In this case, the common network slice identified by the S-NSSAI of "SST=1, SD=none" is determined as a target network slice by the first device 110.

The first device 110 provides 220 at least part of the service to the second device 120. The second device 120 may then be served by the common network slice. Additionally, the first device 110 may transmits, to the second device 120, a response indicating that at least part of the service is available from a network device managed by the target cell 130-3.

In some example embodiments, the first device 110 may further obtain SD value (e.g., SD-10) from the information concerning the service. In this case, by checking the NSSAIs of the candidate network slices deployed in the target cell 130-3, the first device 110 may determine whether a dedicated network slice for organization A is deployed in the target cell 130-3. In other words, if there is a network slice is identified by S-NSSAI of "SST=1, SD=10" in the cell 130-3, then the network slice is determined to be dedicated to the organization A, and the first device 110 may determine to provide the complete service by the dedicated network slice.

If no slice service type of the candidate network slices matches the type of the service, the first device 110 determines that the service is unavailable from the target cell 130-3, and transmits a rejection message to indicate that the first device 110 is unable to provide the service at least in cell 130-3.

Figure 3:
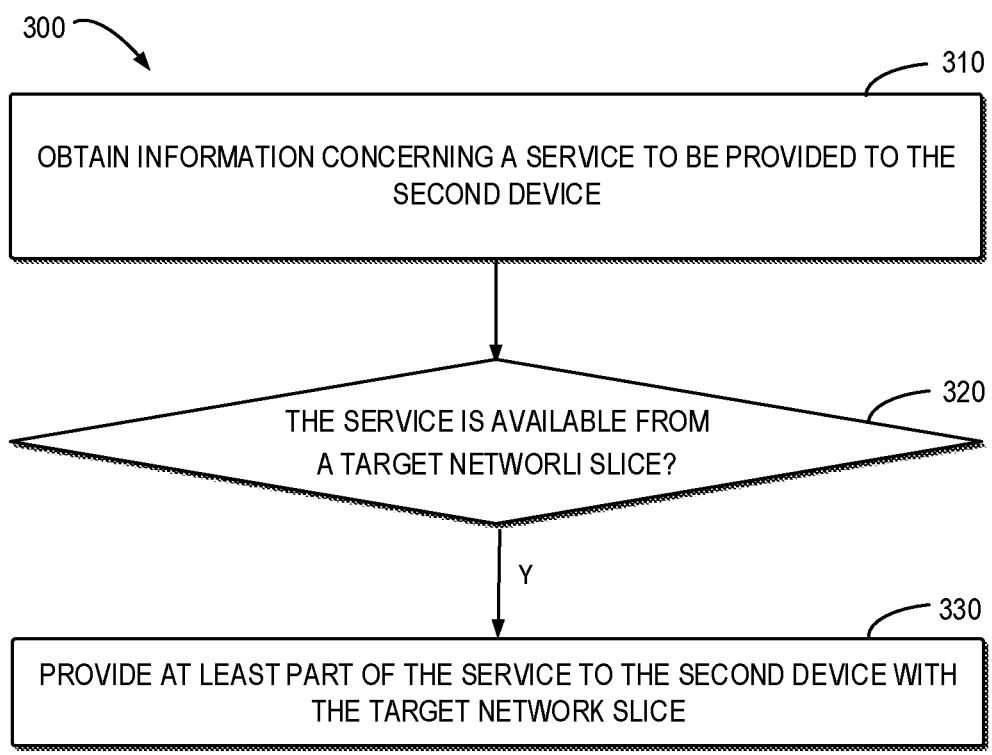
FIG. 3 shows a flowchart of an example method for network slicing according to some example embodiments of the present disclosure.

FIG. 3 shows a flowchart of an example method 300 for network slicing according to some example embodiments of the present disclosure. The method 300 can be implemented by the first device 110-1 as shown in FIG. 1A or the first device 110-3 as shown in FIG. 1B. For the purpose of discussion, the method 300 will be described with reference to FIG. 1A.

At 310, the first device 110-1 obtains information concerning the service to be provided to the second device. For example, in a situation that the second device 120-1 is moving from the source cell 130-1 to the target cell 130-3, the information indicating the second device 120-1 subscribes the network slice identified by S-NSSAI of "SST=1, SD=none" may be obtained from the handover request or the path switch request of the second device 120-1. As another example, in a situation that the second device 120-2 is intended to register in the target cell 130-3, the first device 110-1 may obtain the information from the registration/session setup request transmitted by the second device 120-2.

At 320, the first device 110-1 determines if the service requested by the second device is available from a target network slice managed by the first device 110-1. In an example embodiment, if at least one of network slices deployed in the target cell 130-3 has a SST value matching the type of the service requested by the second device 120-1, the first device 110-1 may determine that the service is available from a target network slice selected from the network slices, and the method 300 will proceed to 330.

In another example embodiment, if none of the network slices deployed in the target cell has a SST value matching the type of the service requested by the second device 120-1, the first device 110-1 may determine that the service is unavailable from the target cell 130-3. In this case, the first device 110-1 may then transmit a rejection message to the second device 120-1 for indicating that the first device 110-1 is unable to provide the service for handling eMBB traffic, and the method 300 ends.

In the example shown in FIG. 1A, since the SST value is "1", the first device 110-1 may determine that the type of service requested by the second device 120-1 is eMBB. Then, the first device 110-1 may check a list of S-NSSAIs for identifying candidate network slices preconfigured in the target cell 130-3. In this case, the list of S-NSSAIs includes the S-NSSAI of "SST=1, SD=100" identifying a dedicated network slice to the organization B and the S-NSSAI of "SST=1, SD=none" identifying the common network slice. Since at least one of candidate network slices deployed in the target cell 130-3 has the SST value of "1", which matches the type of the service requested by the second device 120-1, the first device 110-1 may determine that the target cell 130-3 includes a target network slice for providing the service.

At 330, the first device 110-1 may provide the second device 120-1 with at least part of the service supported by the target network slice. In some example embodiments, the target network slice may be selected from a common network slice and a dedicated network slice for the organization A. For example, the first device 110-1 may further determine if a dedicated network slice for organization A is deployed in the target cell 130-3 by checking SD values of respective candidate network slices from the list of S-NSSAIs. In a case that none of the candidate network slices with the SST value of "1" has a SD value of "10", the first device 110-1 determines that no dedicated network slice for organization A is preconfigured in the target cell 130-3, and thus the common network slice is determined as the target network slice. As described above, the common network slice may provide at least part of the service, such as a basic service for handling eMBB traffic.

Otherwise, in a case that a network slice identified by "SST=1, SD=10" is found within the cell 130-3, which indicates that the dedicated network slice for organization A is preconfigured in the cell 130-3, the first device 110-1 may determine the dedicated network slice as the target network slice for providing the complete service for handing eMBB traffic to the second device 120-1.

It is to be understood that the second device 120-1 and 120-2 may be located in different tracking areas from their respective target cells 130-3 and 130-6. It is also to be understood that although not shown in the accompanying drawings, more than one common network slices with different SST values may be simultaneously deployed in the communication network 100.

According to example embodiments of the present disclosure, by the deployment of a common network slice in RAN, the operators can provide their services to as many users as possible with a relatively low configuration complexity of network slicing. Furthermore, unnecessary failure of call setup or handover across different tracking areas may be avoided.

Figure 4:
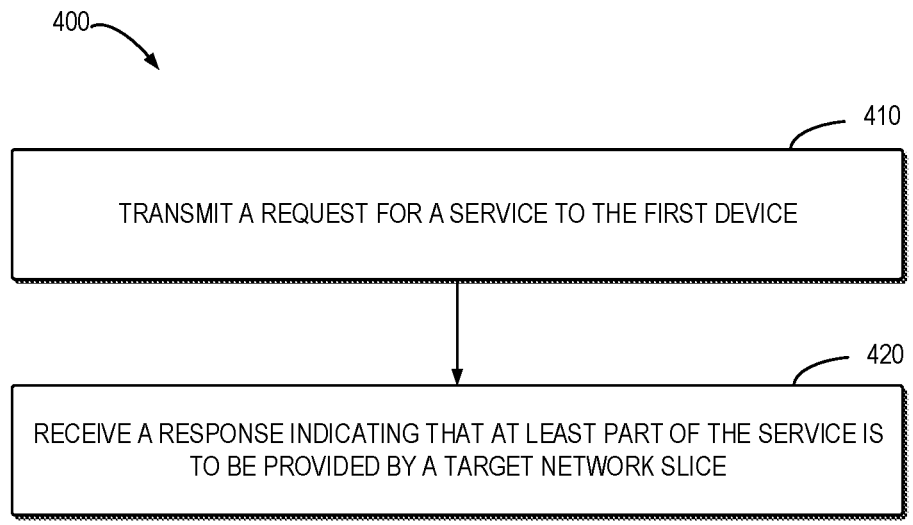
FIG. 4 shows a flowchart of another example method for network slicing according to some example embodiments of the present disclosure.

FIG. 4 shows a flowchart of another example method 400 for network slicing according to some example embodiments of the present disclosure. The method 400 can be implemented by the second devices 120-1 and 120-2 (collectively referred as to the second device 120) as shown in FIG. 1A. For the purpose of discussion, the method 400 will be described with reference to FIG. 1A.

At 410, the second device 120 transmits a request for a service to the first device 110-1. In some example embodiments, the request includes information concerning the service, for example the type of the requested service, or the S-NSSAI of a network slice supporting the service, and the like.

Note that the request may be of various formats depending on particular situations. As a non-limiting example, in a situation the second device 120-2 is intended to setup a call in the cell 130-2, the second device 120-2 may transmit a registration request, such as an INITIAL CONTEXT SETUP request, or a session setup request, such as PDU SESSION RESOURCE SETUP request to the first device 110-1. As another non-limiting example, when the first device 110-1 detects that second device 120-1 is moving from the source cell 130-1 to the target cell 130-3 and triggers a handover procedure, a handover request or a path switch request may be transmitted from either the first device 110-1 or from a third device (not shown) in the core network.

At 420, the second device 120 receives a response indicating that at least part of the service is to be provided by the common network slice. In some example embodiments, for example, in a call setup or session setup situation, the second device 120 may transmit the registration request or the session setup request, the first device 110 may obtain information concerning the service to be provided to the second device 120 from the request. For example, the first device 110 may determine that the second device 120-2 is a terminal device from organization B and a service supported by the dedicated network slice identified by S-NSSAI of "SST=1, SD=100" for organization B is requested.

If the service is available from the target cell, for example, as described in the above 320, and the dedicated network slice with S-NSSAI of "SST=1, SD=100" is preconfigured in the target cell, the dedicated network slice is determined as the target network slice. The second device 120-2 may then receive a registration or session setup response which indicates that the complete service is to be provided by the target network slice which is also the dedicated network slice. If the service is available from the target cell, for example, as described in the above 320, but no dedicated network slice for organization B is preconfigured in the target cell, the common network slice is determined as the target network slice. In this case, the second device 120-2 may receive a registration or session setup response which indicates that at least part of the service is to be provided by the common network slice managed by the first device 110.

In some example embodiments, for example, in a handover situation, the first device 110 may receive a handover request or path switch request of the second device 120. For example, the first device 110 may determine that second device 120-1 is a terminal device from organization A, and a service supported by the dedicated network slice identified by S-NSSAI of "SST=1, SD=10" for organization A is requested.

If the service is available from the target cell 130-3, for example, as described in the above 320, and the dedicated network slice with S-NSSAI of "SST=1, SD=10" is preconfigured in the target cell, the dedicated network slice is determined as the target network slice. The second device 120-1 may then receive a handover response or path switch request acknowledgement to indicate that the handover procedure is succeeded. The handover response or path switch request acknowledgement further indicates that the complete service is to be provided by the target network slice which is also the dedicated network slice.

If the service is available from the target cell 130-3, for example, as described in the above 320, but no dedicated network slice for organization B is preconfigured in the target cell as shown in FIG. 1A, the common network slice identified by S-NSSAI of "SST=1, SD=none" is determined as the target network slice. The second device 120-1 may then receive to indicate that the handover procedure is succeeded and at least part of the service is to be provided by the common network slice managed by the first device 110.

In the above case, even if the second device 120 enters or moves from among different tracking areas, the procedures of call setup, session setup or handover may still be accomplished. As such, the second device 120 can camp on the target cell, and be served by at least emergency services.

According to the example embodiments of the present disclosure, with a separate deployment of dedicated network slices and one or more common network slices, it is possible to ensure the service isolation as well as independent operation and maintenance requirements of various subscribers, enterprises, VIP users, or etc., in the communication network, at the same time, the communication network is an open network so that the operators can provide services to as many users as possible.

In some example embodiments, an apparatus capable of performing the method 300 (for example, implemented at the first device 110) may comprise means for performing the respective steps of the method 300. The means may be implemented in any suitable form. For example, the means may be implemented in a circuitry or software module.

In some example embodiments, the apparatus comprises means for obtaining information concerning a service to be provided to a second device; means for determining whether the service is available from a target network slice managed by the first device; and means for providing, in response to a determination that the service is available from the target network slice, at least part of the service to the second device with the target network slice, the target network slice comprising at least one of a common network slice and a dedicated network slice for the second device, the common network slice being preconfigured to provide at least part of the service.

In some example embodiments, means for obtaining the information comprises means for obtaining the information from a registration request received from the second device; or means for obtaining the information from a session setup request received from the second device.

In some example embodiments, means for obtaining the information comprises means for obtaining the information from a handover request received from a third device serving the second device; or means for obtaining the information from a path switch request received from the third device.

In some example embodiments, means for determining whether the service is available from a target network slice managed by the first device comprises means for obtaining a type of the service from the information concerning the service; means for determining, in response to a slice service type of one of candidate network slices matching the type of the service, the one of candidate network slices as the target network slice; and means for determining that the service is available from the target network slice.

In some example embodiments, the apparatus further comprises means for determining, in response to no slice service type of the candidate network slices being matching the type of the service, the service is unavailable from the target network slice; and means for transmitting a rejection message to indicate that the first device is unable to provide the service.

In some example embodiments, an apparatus capable of performing the method 400 (for example, implemented at the second device 120) may comprise means for performing the respective steps of the method 400. The means may be implemented in any suitable form. For example, the means may be implemented in a circuitry or software module.

In some example embodiments, the apparatus comprises means for transmitting a registration request comprising information concerning the service; or means for transmitting a session setup request comprising information concerning the service.

Figure 5:
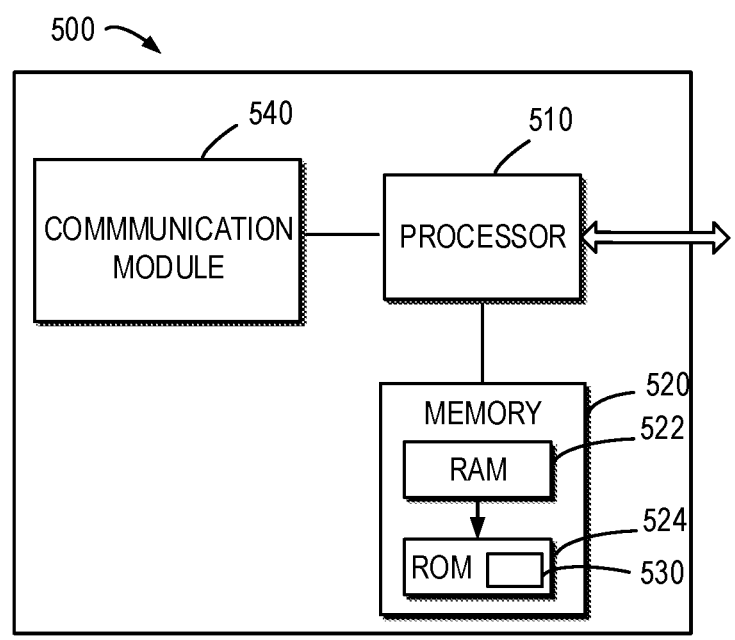
FIG. 5 is a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the terminal devices 120-1 and 120-2 and the network devices 110-1, 110-2 as shown in FIGS. 1A and 1B. As shown, the device 500 includes one or more processors 510, one or more memories 540 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 1020. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 3 and 4. The embodiments of the present disclosure may also be implemented by hardware or by a combination of software and hardware.

Figure 6:
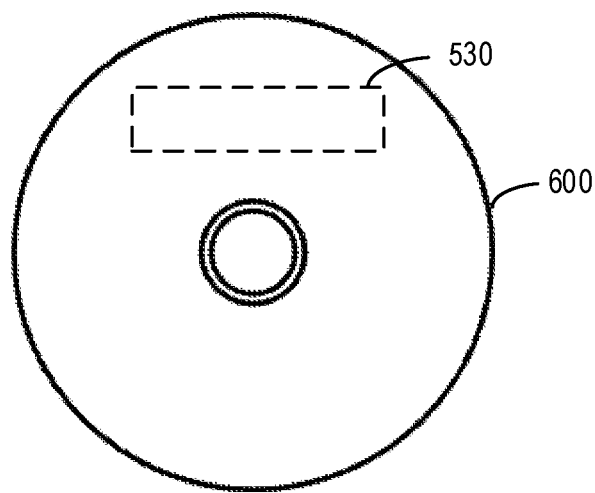
FIG. 6 illustrates a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program codes;
   the at least one memory and the computer program codes are configured to, with the at least one processor, cause the first device to:
   obtain information concerning a service to be provided to a second device within a first tracking area, wherein the information comprises at least a device Slice/Service Type (SST) value and a device Slice Differentiator (SD) value;
   determine whether the service is available from a target network slice managed by the first device based on the information, a network SST value associated with the target network slice, and a network SD value associated with the target network slice;
   in response to a determination that the device SST value matches the network SST value and the device SD value matches the network SD value, provide at least part of the service to the second device with the target network slice comprising a dedicated network slice; and in response to a determination that the device SST value matches the network SST value and the device SD value does not match the network SD value, provide at least part of the service to the second device with a common network slice, the common network slice being preconfigured to provide at least part of the service.

2. The first device of claim 1, wherein the first device is caused to obtain the information by:
obtaining the information from a registration request received from the second device; or
obtaining the information from a session setup request received from the second device.

3. The first device of claim 1, wherein the first device is caused to obtain the information by:
obtaining the information from a handover request received from a third device serving the second device; or
obtaining the information from a path switch request received from the third device.

4. The first device of claim 1, wherein the first device is caused to determine whether the service is available from a target network slice managed by the first device by:
obtaining a type of the service from the information concerning the service;
in response to a slice service type of one of candidate network slices matching the type of the service, determining the one of candidate network slices as the target network slice; and
determining that the service is available from the target network slice.

5. The first device of claim 4, the first device is further caused to:
in response to no slice service type of the candidate network slices matching the type of the service, determine the service is unavailable from the target network slice; and
transmit a rejection message to indicate that the first device is unable to provide the service.

6. The first device of claim 1, wherein the first device is a network device, and the second device is a terminal device.

7. The first device of claim 1, wherein providing at least part of the service to the second device with the target network slice enables a call setup, a session setup or a handover to be performed while the second device moves into a second tracking area, different to the first tracking area.

8. A method implemented at a first device, comprising:
obtaining information concerning a service to be provided to a second device within a first tracking area, wherein the information comprises at least a device Slice/Service Type (SST) value and a device Slice Differentiator (SD) value;

determining whether the service is available from a target network slice managed by the first device based on the information, a network SST value associated with the target network slice, and a network SD value associated with the target network slice;

in response to a determination that the device SST value matches the network SST value and the device SD value matches the network SD value, providing at least part of the service to the second device with the target network slice comprising a dedicated network slice; and in response to a determination that the device SST value matches the network SST value and the device SD value does not match the network SD value, provide at least part of the service to the second device with a common network slice, the common network slice being preconfigured to provide at least part of the service.

9. The method of claim 8, wherein obtaining the information comprises:
obtaining the information from a registration request received from the second device; or
obtaining the information from a session setup request received from the second device.

10. The method of claim 8, wherein obtaining the information comprises:
obtaining the information from a handover request received from a third device serving the second device; or
obtaining the information from a path switch request received from the third device.

11. The method of claim 8, wherein determining whether the service is available from a target network slice managed by the first device comprises:
obtaining a type of the service from the information concerning the service;
in response to a slice service type of one of candidate network slices matching the type of the service, determining the one of candidate network slices as the target network slice; and
determining that the service is available from the target network slice.

12. The method of claim 11, further comprising:
in response to no slice service type of the candidate network slices matching the type of the service, determining the service is unavailable from the target network slice; and
transmitting a rejection message to indicate that the first device is unable to provide the service.

13. The method of claim 8, wherein the first device is a network device, and the second device is a terminal device.

14. The method of claim 8, wherein providing at least part of the service to the second device with the target network slice enables a call setup, a session setup or a handover to be performed while the second device moves into a second tracking area, different to the first tracking area.

* * * * *